E. DORR.
Hay Loader.
No. 43,481.                                        Patented July 12, 1864.
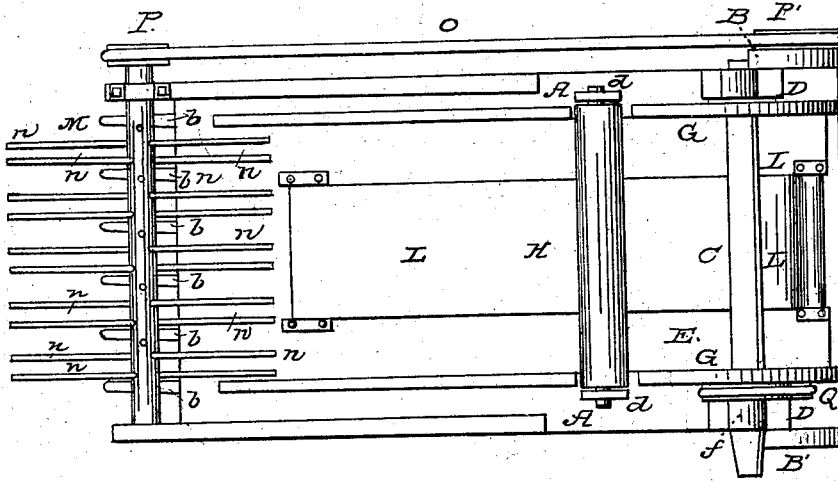
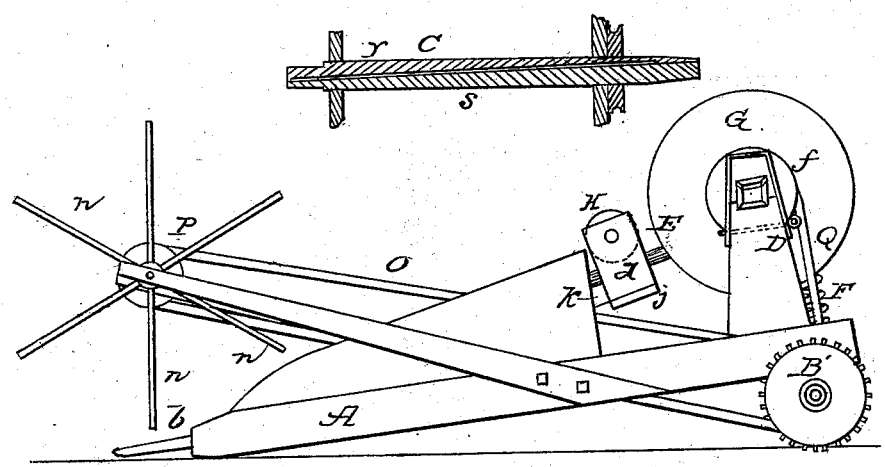
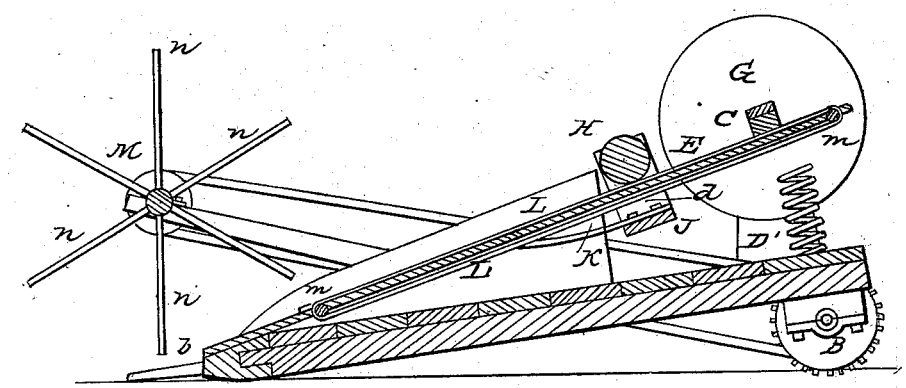
WITNESSES
Melville Biggs
W. L. Bennett
INVENTOR
Edward Dorr
by his attorney
E. S. Renwick

UNITED STATES PATENT OFFICE.

EDWARD DORR, OF ROCKFORD, ILLINOIS.

IMPROVED MODE OF BALING HAY AND OTHER MATERIALS.

Specification forming part of Letters Patent No. 43,481, dated July 12, 1864.

*To all whom it may concern:*

Be it known that I, EDWARD DORR, of Rockford, in the county of Winnebago and State of Illinois, have invented a new and useful improvement in the art of baling hay, straw, raw hemp, raw flax, raw cotton, and similar stalks or fibrous materials which are usually baled for transportation to market; and I do hereby declare that the following is a full, clear, and exact description of my invention, reference being had to the accompanying drawings, in which—

Figure 1 represents a plan of the principal parts of a machine suitable for practicing my invention. Fig. 2 represents a side view of the same. Fig. 3 represents a vertical longitudinal section of the same, and Fig. 4 represents a longitudinal section of the compressing-shaft of the machine.

The invention which constitutes the subject-matter of this patent is a new and improved mode of baling stalks and unmanufactured fibrous materials, and does not include the machinery for effecting the operation, as this constitutes the subject-matter of a separate patent.

The principles upon which my new mode of baling are based are, first, the progressive winding of the material in a layer upon itself while under pressure and while confined laterally; and, secondly, the ventilation of the material in the bale by the formation of one or more ventilating-openings in the bale, so as to permit the moisture to escape by evaporation from the body of the bale.

The accompanying drawings represent a machine suitable for practicing my invention upon hay lying in the field, the machine being constructed to be drawn over the field like a reaping-machine or a seed-drill, and to gather up and compress the hay into bales, according to the principles of my invention. All the acting parts of this machine are secured to a carriage, which is to be fitted with a tongue by which it can be drawn by horses, said tongue not being shown in the drawings, as the construction, application, and operation of a draft-tongue are well known to builders and users of agricultural machines. The side pieces, A A, of this carriage are curved at their forward ends like sled-runners, so as to slide over the ground. At their hinder ends they are supported by wheels B B′, one of which is connected with and operates the pressing mechanism, while the other, B, operates the automatic gatherer. The front side of the carriage is fitted with rake-teeth $b\,b$, which rake the hay as the machine is drawn forward, and operate in substantially the same manner as the teeth of horse-rakes.

The compressing and gathering mechanisms are mounted upon the carriage. The shaft C, on which the material is wound, is supported by standards D D′, the cap $f$ of one of which is removable to permit the shaft to be readily removed when the bale is completed and replaced before the formation of a new bale is commenced. Below this shaft is the platform E, between which and the shaft C the material is compressed. This platform is formed in this instance of a spring-board, secured at its front end to the carriage, so that its hinder end, which is beneath the compressing-shaft C, can yield and separate from the shaft as the bale increases in diameter, but presses the material wound on the compressing-shaft with a force due to the elasticity and rigidity of the wood of which it is composed. In order to increase the force used in compressing the material, springs F are introduced beneath the platform, and in this instance these are arranged, as shown in the drawings, to remain inoperative until the bale has reached a certain diameter. The compressing-shaft C is fitted with a pair of removable heads, G G, which confine the material laterally and determine the form of the ends of the bale produced.

The teeth $b\,b$, as represented in the drawings, are situated at the front of the machine, and the compressing mechanism at its hinder end. Between these two there is a yielding roller, H, to act upon the material passing along the platform to the compressing-shaft C, and thus compress the layer before it is wound upon the shaft. The journals of this roll are supported in standards $d\,d$, which are connected with a cross-beam, J, beneath the platform E, and with springs K, (one at each side of the platform,) so that the roller operates with a yielding pressure upon the layer of material passing beneath it to the compressing-shaft C.

In order that the material may be conveyed from the front end of the machine to the compressing mechanism, an endless apron or conveyer, L, is provided. This apron is supported by two rollers, $m\,m$, at its ends, and its upper portion lies upon the platform and passes under the compressing-shaft C, so that the bale lies upon it. Hence the surface of the compressing-shaft C will move the apron by contact with it before the bale is commenced, and as soon as the bale begins to form its surface will move the apron by contact. The apron may, however, be driven by a special mechanism, if this plan be deemed expedient.

In order that the material may be gathered up automatically, an automatic rake or gatherer is employed. This consists, in the machine represented, of a series of radial arms, $n$, secured to a shaft, M, to which a revolving movement is imparted by means of a belt, O, encircling belt-pulleys P P', secured to the shaft M and to one of the running-wheels B, so that the gatherer is caused to revolve automatically as the machine is drawn over the field. The compressing-shaft C is caused to revolve in a similar manner by means of the driving-wheel B', and in the machine represented, which is an illustration of one mode of embodying my invention, the power is transmitted from the shaft of the running-wheel to the compressing-shaft by a belt. I contemplate, however, the employment of cog-wheel gearing for this purpose whenever the force required to wind up the material under the pressure is such that a belt would slip. The compressing-shaft C is formed tapering, so that it may be more readily withdrawn from the complete bale, and in order to facilitate this operation the shaft is formed of two parts, $r$ $s$, which are wedge-formed in opposite directions, so that one may be withdrawn before the other. The end of this shaft is made square, so that a capstan-head or crank may be applied to it or gearing so as to operate the shaft and compress material fed to the machine into bales when the machine is at rest. In order to diminish the friction, one or more rollers may be arranged under the upper member of the conveying-apron parallel with and opposite to the compressing-shaft.

The machine thus described is designed to rake up and bale hay from the field so as to dispense with the necessity of conveying it to a stationary press. It may also be used as a stationary press, in which case the compressing-shaft is to be driven by any suitable power, and the hay or other material is to be fed upon the apron.

In the baling of materials which are to remain in the bale for transportation to market—such as hay, and straw, and raw cotton—the bale should be secured by a few longitudinal staves and one or more bands of wire or cord. The bands may, however, be of much less strength than those usually required for bales, as the wrapping of each succeeding layer of stalks or fiber around its predecessors assists in binding them together.

From the foregoing description it appears that the material to be baled is wound up progressively in a thin layer upon the compressing-shaft in such manner that the portion wound at each succeeding revolution embraces the preceding portions; or, in other words, that the material is wound upon itself; also, that during the winding the material is subjected to the pressure due to the rigidity of the spring-platform and the springs which act upon the platform, as well as to a preliminary pressure in the layer by the yielding pressure-roller which precedes the compressing shaft. Moreover, the material is confined laterally by the heads applied to the compressing-shaft, so that the heads of the bale have a definite form. It is also obvious that when the compressing-shaft is withdrawn a ventilating-opening is left in the body of the bale through which the moisture may escape by evaporation, and if more than one ventilating-opening is desired such additional openings may be formed by applying tapering staves of wood or metal to the bale as the layer of material is wound up, so that these staves are wound up in the bale from which they are substantially withdrawn endwise.

I do not claim any abstract principles as my invention; but

What I do claim, and desire to secure by Letters Patent, is—

1. The mode of baling stalks and unmanufactured fibrous materials by winding the material progressively upon itself while under pressure, substantially as set forth.

2. The mode of forming ventilating-openings in bales of stalks and unmanufactured fibrous materials, substantially as set forth.

In testimony whereof I have hereunto subscribed my name this 19th day of March, A. D. 1864.

EDWARD DORR.

Witnesses:
 ALBERT E. WHITE,
 J. G. MANLOVE.